(12) United States Patent
Yang et al.

(10) Patent No.: US 8,328,298 B2
(45) Date of Patent: Dec. 11, 2012

(54) ELECTRO-HYDRAULIC BRAKE SYSTEM

(75) Inventors: I Jin Yang, Gyeonggi-do (KR); Seong Ho Choi, Gyunggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 193 days.

(21) Appl. No.: 12/846,342

(22) Filed: Jul. 29, 2010

(65) Prior Publication Data
US 2011/0025121 A1 Feb. 3, 2011

(30) Foreign Application Priority Data

Jul. 29, 2009 (KR) .................. 10-2009-0069422

(51) Int. Cl.
*B60T 13/12* (2006.01)
(52) U.S. Cl. ............... 303/119.1; 303/15; 303/115.1
(58) Field of Classification Search ............... 303/114.1, 303/114.3, 3, 15, 113.1, 115.1, 119.1; 188/358, 188/359
See application file for complete search history.

(56) References Cited

U.S. PATENT DOCUMENTS

| | | | |
|---|---|---|---|
| 6,183,049 B1 * | 2/2001 | Oka et al. .................. | 303/114.1 |
| 6,196,641 B1 * | 3/2001 | Oka et al. .................. | 303/114.1 |
| 6,705,683 B2 | 3/2004 | Niepelt et al. | |
| 2011/0006594 A1 * | 1/2011 | Ganzel ........................... | 303/10 |
| 2011/0285197 A1 * | 11/2011 | Ganzel ........................... | 303/2 |

FOREIGN PATENT DOCUMENTS

| | | |
|---|---|---|
| JP | 2000168547 A | 6/2000 |
| JP | 2004-345629 | 12/2004 |
| KR | 10-2009-0069422 | 5/2011 |
| WO | WO-2008/096224 A1 | 8/2008 |

OTHER PUBLICATIONS

Chinese Office Action, and English translation thereof, issued in Chinese Patent Application No. 201010240064.0 dated Aug. 3, 2012.

* cited by examiner

*Primary Examiner* — Christopher Schwartz
(74) *Attorney, Agent, or Firm* — McDermott Will & Emery LLP

(57) ABSTRACT

Disclosed herein is an electro-hydraulic brake system. The electro-hydraulic brake system includes a master cylinder to transmit brake oil, a high-pressure accumulator to transmit brake oil independently of the master cylinder, first and second circuits connected respectively to the master cylinder, at least one first wheel to be braked by the first circuit, and at least one second wheel to be braked by the second circuit. The first circuit is connected to the high-pressure accumulator, to control the first wheel. The second circuit is connected to the first circuit, to control the second wheel.

9 Claims, 3 Drawing Sheets

ELECTRO-HYDRAULIC BRAKE SYSTEM

CROSS-REFERENCE TO RELATED APPLICATION

This application claims the benefit of Korean Patent Application No. 2009-0069422, filed on Jul. 29, 2009 in the Korean Intellectual Property Office, the disclosure of which is incorporated herein by reference.

BACKGROUND

1. Field

Embodiments of the present invention relate to an electro-hydraulic brake system to control hydraulic brake force according to a change in regenerative brake force.

2. Description of the Related Art

A hybrid electric vehicle includes more than one power source, such as an electric motor (drive motor) and an internal combustion engine, and selectively uses power of the engine or the electric motor according to the load and velocity of the vehicle. The motor also functions to convert the remaining energy into electric energy. Thus, the hybrid electric vehicle may achieve high fuel efficiency and low environmental pollution.

In the above described hybrid electric vehicle, drive wheels of the vehicle are rotated by the electric motor that is operated by electric energy during traveling. In this case, the utilization efficiency of electric energy in the electric motor may be very important. To this end, if a vehicle driver commands deceleration or braking, the electric motor functions as a generator to generate electric energy. The generated electric energy is stored in a capacitor. While the electric motor functions as a generator, brake force is applied to the wheels of the vehicle. This is referred to as regenerative braking. In conclusion, the brake force applied to the wheels is the sum of regenerative brake force generated by the electric motor and hydraulic brake force generated by a hydraulic mechanism.

In other words, driver requested braking may be satisfied by generating only the hydraulic brake force that corresponds to a difference between the regenerative brake force generated by the electric motor and brake force demanded by the driver.

SUMMARY

Therefore, it is an aspect of the present invention to provide an electro-hydraulic brake system in which each circuit may brake wheels by use of a high-pressure accumulator for control of hydraulic brake force.

Additional aspects of the invention will be set forth in part in the description which follows and, in part, will be obvious from the description, or may be learned by practice of the invention.

In accordance with an aspect of the present invention, an electro-hydraulic brake system includes a master cylinder to transmit brake oil, a high-pressure accumulator to transmit brake oil independently of the master cylinder, a first circuit connected to the master cylinder and the high-pressure accumulator, a second circuit connected to the master cylinder and the first circuit, a first wheel to be braked by the first circuit, and a second wheel to be braked by the second circuit, wherein the first circuit includes a first flow-rate control valve to control a flow rate of the brake oil transmitted from the high-pressure accumulator into the first circuit, and the second circuit includes a second flow-rate control valve to control a flow rate of the brake oil introduced into the second circuit.

The electro-hydraulic brake system may further include a first inlet path provided with the first flow-rate control valve and connecting the high-pressure accumulator and the first circuit to each other, and a second inlet path provided with the second flow-rate control valve and connecting the first circuit and the second circuit to each other.

The electro-hydraulic brake system may further include a first backup path connecting the master cylinder and the first circuit to each other, a second backup path connecting the master cylinder and the second circuit to each other, a first mode switching valve to control connection between the first backup path and the master cylinder, and a second mode switching valve to control connection between the second backup path and the master cylinder.

The electro-hydraulic brake system may further include a first pressure sensor provided at an exit side of the first flow-rate control valve to measure pressure of oil introduced into the first circuit, and a second pressure sensor provided at an exit side of the second flow-rate control valve to measure pressure of oil introduced into the second circuit.

The electro-hydraulic brake system may further include a third pressure sensor provided at an entrance side of the first mode switching valve to measure brake pedal pressure.

The first mode switching valve, the second mode switching valve, the first flow-rate control valve and the second flow-rate control valve may be arranged in a row, to control transmission of the brake oil to the wheels.

During normal braking, the first mode switching valve and the second mode switching valve may be kept in a closed state, and the first flow-rate control valve and the second flow-rate control valve may transmit hydraulic pressure generated in the high-pressure accumulator to the first circuit and the second circuit, and during emergency braking, the first mode switching valve and the second mode switching valve may be kept in an open state, to transmit hydraulic pressure generated in the master cylinder to the first circuit and the second circuit.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
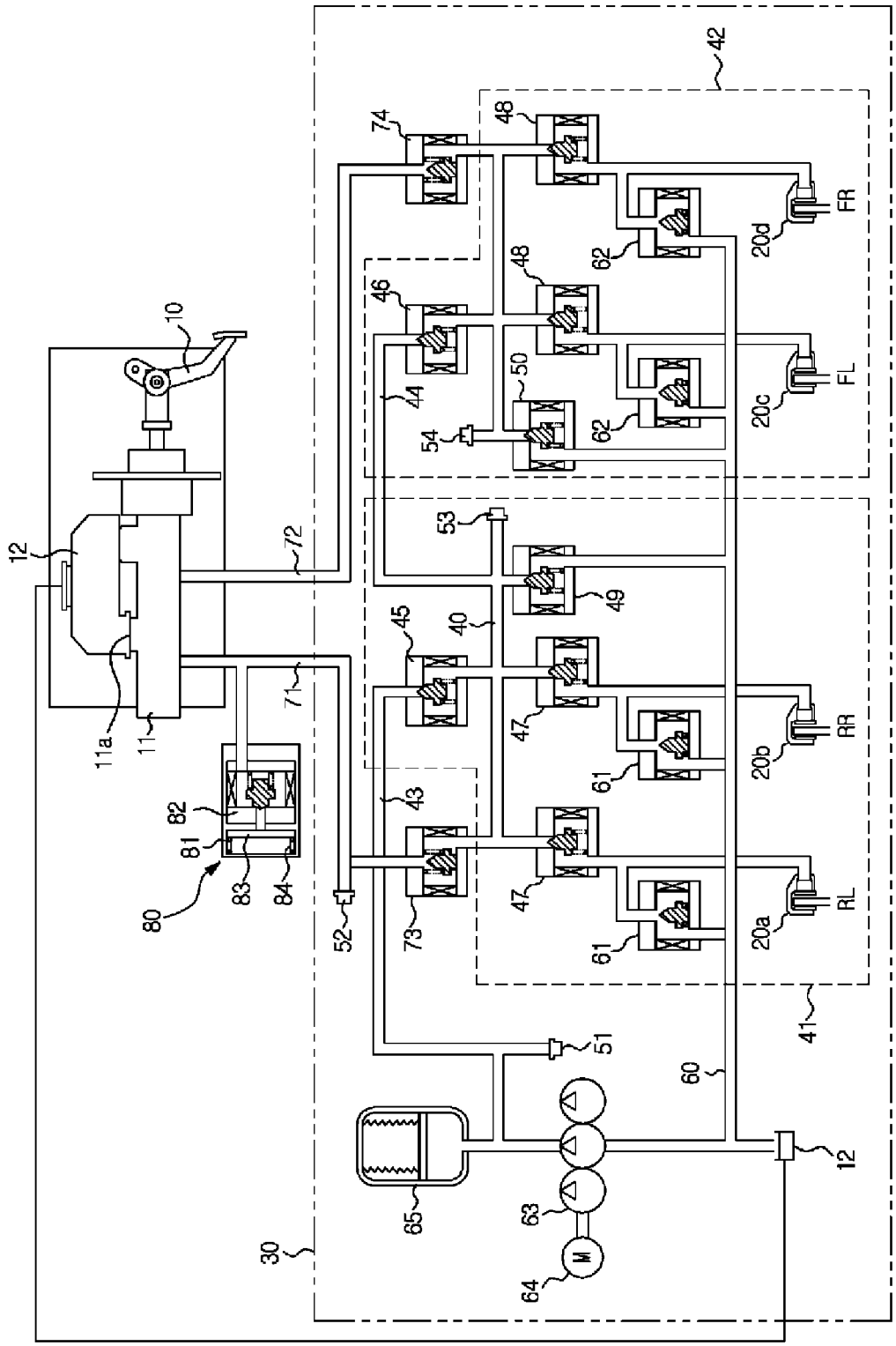
FIG. 1 is a hydraulic circuit diagram illustrating a non-braking mode of an Electro-Hydraulic Brake (EHB) system in accordance with an embodiment of the present invention.

Reference will now be made in detail to the embodiment of the present invention, examples of which are illustrated in the accompanying drawings, wherein like reference numerals refer to like elements throughout.

FIG. 1 is a hydraulic circuit diagram illustrating a non-braking mode of an electro-hydraulic brake system in accordance with the embodiment of the present invention.

Referring to FIG. 1, the electro-hydraulic brake system (hereinafter, referred to as "EHB" system) in accordance with the embodiment may include a brake pedal 10 to be operated by a driver upon braking, a master cylinder 11 to which force from the brake pedal 10 is transmitted, a reservoir 12 located above the master cylinder 11 to store oil therein, wheel cylinders 20a, 20b, 20c and 20d to perform braking of respective wheels RR, RL, FR and FL using the oil transmitted from the reservoir 12, and a hydraulic control unit 30 (hereinafter, referred to as "HCU") provided between the master cylinder 11 and the wheel cylinders 20a, 20b, 20c and 20d.

The driver may decelerate or stop a traveling vehicle by pressing the brake pedal 10.

The master cylinder 11 is located to receive the oil from the reservoir 12 located thereabove, and to discharge the oil downward through an exit 11a thereof. The discharged oil is introduced into the HCU 30.

The HCU 30 may include a first circuit 41 to control the rear wheels RL and RR and a second circuit 42 to control the front wheels FL and FR.

The first circuit 41 may include a first inlet path 43 connected to the wheel cylinders 20a and 20b. In addition, the first circuit 41 may include, for example, a flow-rate control valve 45, inlet valve 47, pressure reducing valve 61 and pressure sensor 53. The second circuit 42 may include a second inlet path 44 connected to the wheel cylinders 20c and 20d. In addition, the second circuit 42 may include, for example, a flow-rate control valve 46, inlet valve 48, pressure reducing valve 62 and pressure sensor 54.

The HCU 30 may include a pump 63, motor 64 and high-pressure accumulator 65. An exit of the high-pressure accumulator 65 may be connected to the first inlet path 43 of the first circuit 41. The first circuit 41 and second circuit 42 may be connected to each other via a connection path 40, to allow brake oil of the high-pressure accumulator 65 to pass through the first circuit 41 and second circuit 42 in sequence. In this way, the brake oil having passed through the first inlet path 43 of the first circuit 41 may be transmitted to the second inlet path 44 of the second circuit 42 through the connection path 40.

The pump 63 functions to pump the oil transmitted from the reservoir 12 at a high pressure to create brake pressure. To this end, the motor 64 is connected to the pump 63 to provide the pump 63 with drive power.

The high-pressure accumulator 65 is provided at an exit side of the pump 63 and temporarily stores high-pressure oil generated by operation of the pump 63. A first pressure sensor 51 is provided at an exit side of the high-pressure accumulator 65 to measure the pressure of the oil from the high-pressure accumulator 65. If the measured oil pressure is lower than a preset pressure, the pump 63 is operated to suction the oil of the reservoir 12 and to charge the high-pressure accumulator 65 with the oil.

The first flow-rate control valve 45 is of a normal close type and is normally kept in a closed state. The first flow-rate control valve 45 is opened when the driver pushes the brake pedal 10, allowing the brake oil stored in the high-pressure accumulator 65 to be introduced into the first circuit 41.

The third pressure sensor 53 is provided at an exit side of the first flow-rate control valve 45 to measure the pressure of oil introduced into the first circuit 41. The opening rate of the first flow-rate control valve 45 is regulated based on the measured oil pressure, to control the flow rate of brake oil introduced into the first circuit 41.

The first inlet valve 47 is of a normal close type and is normally kept in a closed state. The first inlet valve 47 is opened when the driver pushes the brake pedal 10, allowing the brake oil in the first circuit 41 to be transmitted to the corresponding wheel cylinder.

The first pressure reducing valve 61 is of a normal open type and is normally kept in an open state. The first pressure reducing valve 61 is closed when the driver pushes the brake pedal 10, to prevent the brake oil from being transmitted to the corresponding wheel cylinder.

The second flow-rate control valve 46 is of a normal close type and is normally kept in a closed state. The first flow-rate control valve 45 is opened when the driver pushes the brake pedal 10, allowing the brake oil having passed through the first flow-rate control valve 45 of the first circuit 41 to be introduced into the second circuit 42.

The fourth pressure sensor 54 is provided at an exit side of the second flow-rate control valve 46 to measure the pressure of oil introduced into the second circuit 42. The opening rate of the second flow-rate control valve 46 is regulated based on the measured oil pressure, to control the flow rate of the brake oil introduced into the second circuit 42.

The second pressure reducing valve 62 is of a normal open type and is normally kept in an open state. The second pressure reducing valve 62 is closed when the driver pushes the brake pedal 10, to prevent the brake oil from being transmitted to the corresponding wheel cylinder.

The HCU 30 may include a return path 60 that connects an entrance of the pump 63 to the wheel cylinders 20a, 20b, 20c and 20d. The return path 60 may be provided with pressure reducing valves 61 and 62 that discharge the oil of the wheel cylinders 20a, 20b, 20c and 20d to the entrance of the pump 63. The oil discharged from the pressure reducing valves 61 and 62 may be temporarily stored in the reservoir 12.

A first backup path 71 and second backup path 72 may be provided between the exit 11a of the master cylinder 11 and the wheel cylinders 20a, 20b, 20c and 20d. These backup paths 71 and 72 may be used when the EHB system breaks down. The first backup path 71 may be provided with a first mode switching valve 73 to open or close the first backup path 71, and the second backup path 72 may be provided with a second mode switching valve 74 to open or close the second backup path 72.

The first mode switching valve 73 is of a normal open type and is normally kept in an open state. The first mode switching valve 73 is closed during normal braking, to prevent hydraulic pressure generated in the master cylinder 11 from being transmitted to the first circuit 41. On the other hand, if an emergency braking situation, such as breakdown of the system, occurs, the first mode switching valve 73 is opened to transmit the hydraulic pressure of the master cylinder 11 to the first circuit 41.

The second mode switching valve 74 is of a normal open type and is normally kept in an open state. The first mode switching valve 73 is closed during normal braking to prevent hydraulic pressure generated in the master cylinder 11 from being transmitted to the second circuit 42. On the other hand, if an emergency braking situation, such as breakdown of the system, occurs, the second mode switching valve 74 is opened to transmit the hydraulic pressure of the master cylinder 11 to the second circuit 42.

A second pressure sensor 52 to measure the pressure of oil from the master cylinder 11 may be provided between the first mode switching valve 73 and the exit 11a of the master cylinder 11. The backup path 71 may be intercepted by the first mode switching valve 73 during normal braking, and the second pressure sensor 52 may be used to determine driver requested braking.

A pedal simulator 80 may be provided between the second pressure sensor 52 and the master cylinder 11, to generate pedal force of the brake pedal 10.

The pedal simulator 80 includes a simulation chamber 81 to store the oil discharged from the exit 11a of the master cylinder 11 and a simulator valve 82 provided at an entrance of the simulation chamber 81. The simulation chamber 81 contains a piston 83 and elastic member 84 so as to be displaced within a constant range by the oil introduced thereinto. The simulator valve 82 is of a normal close type and is normally kept in a closed state. The simulator valve 82 is opened when the driver pushes the brake pedal 10, allowing the brake oil to be transmitted into the simulation chamber 81.

An Electric Control Unit (ECU) (not shown) to control electrically operative constituent elements and the HCU 30 containing the above described pedal simulator 80 may be combined to define a single compact Hydro Electronic Control Unit (HECU).

In the EHB system in accordance with the embodiment of the present invention, the simulator to create the pedal force as well as the motor, pump, accumulator, various valves and sensors are contained in the HCU in the form of a single block and thus, a master cylinder having a simulator only for the EHB system may be unnecessary. In this way, any generalized master cylinder may be used.

In addition, the simulator of the HCU is installed to protrude outward. This may prevent deterioration in reliability and durability of the EHB system due to abrasion of a seal inside the master cylinder and also, may reduce a space for arrangement of the master cylinder.

Hereinafter, operation of the EHB system in accordance with the embodiment of the present invention will be described in detail.

Figure 2:
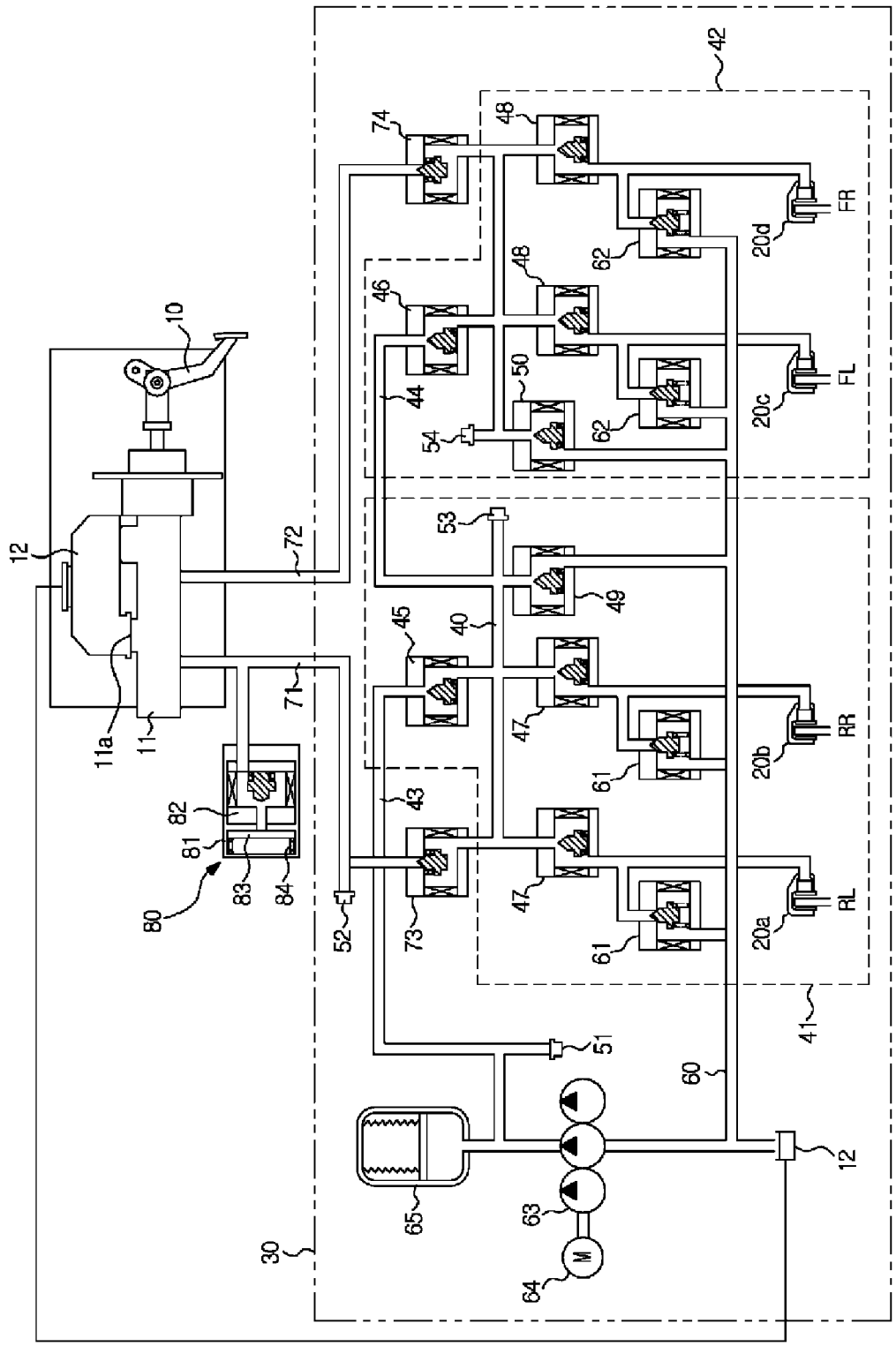
FIG. 2 is a hydraulic circuit diagram illustrating a braking mode of the electro-hydraulic brake system in accordance with the embodiment of the present invention under normal operation of the system.

FIG. 2 is a hydraulic circuit diagram illustrating a braking mode of the EHB system under normal operation of the system.

Referring to FIG. 2, in a normal braking mode, if the driver pushes the brake pedal 10, the first and second mode switching valves 73 and 74 are kept in a closed state to intercept the first and second backup paths 71 and 72.

The pedal simulator 80 provides tactile feedback to the driver through the pedal. The force applied to the pedal 10 by the driver is transmitted to the pedal simulator 80, creating tactile feedback.

A control unit may sense brake force demanded by the driver from information, such as pressure applied to the pedal 10 by the driver, etc. In addition, the magnitude of regenerative brake force may be input into the control unit. The control unit may calculate the magnitude of frictional brake force corresponding to a difference between the brake force demanded by the driver and the regenerative brake force, and consequently, may determine the magnitude of increased or decreased pressure at the wheels.

If the driver pushes the brake pedal 10 at an initial braking stage, the vehicle is sufficiently braked by the regenerative brake force and thus, may be controlled to generate no frictional brake force. That is, since the backup paths 71 and 72 are intercepted, the hydraulic pressure of the master cylinder 11 is not transmitted to the wheel cylinders 20a, 20b, 20c and 20d.

Thereafter, an operation of regulating the frictional brake force according to a change in the regenerative brake force may be performed. The regenerative brake force is changed according to the charging rate of a battery or the velocity of the vehicle. For example, the regenerative brake force exhibits a rapid decrease below a predetermined velocity. To deal with this situation, it may be necessary to increase the frictional brake force.

The first flow-rate control valve 45 may control the flow rate of brake oil transmitted from the high-pressure accumulator 65 to the first circuit 41 through the first inlet path 43. The second flow-rate control valve 46 may control the flow rate of brake oil transmitted from the first inlet path 43 of the first circuit 41 to the second inlet path 44 of the second circuit 42 through the connection path 40.

Since no regenerative brake force is generated, the frictional brake force equal to brake force demanded by the driver may be generated. That is, the first flow-rate control valve 45 and second flow-rate control valve 46 may supply the brake oil of the high-pressure accumulator 65 toward the wheel cylinders 20a, 20b, 20c and 20d.

Figure 3:
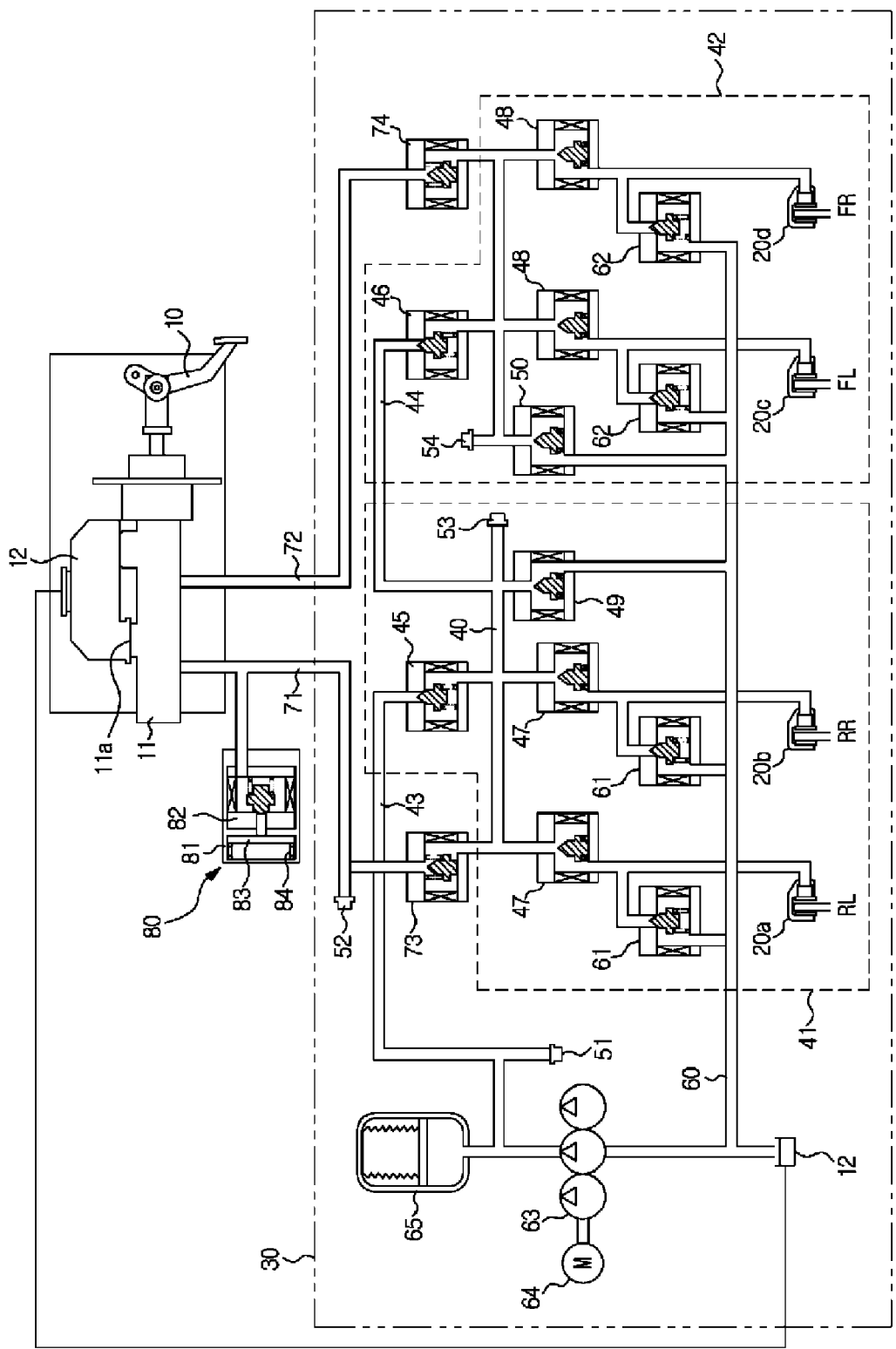
FIG. 3 is a hydraulic circuit diagram illustrating a braking mode of the electro-hydraulic brake system in accordance with the embodiment of the present invention under abnormal operation of the system.

FIG. 3 is a hydraulic circuit diagram illustrating a braking mode of the EHB system under abnormal operation of the system.

Referring to FIG. 3, assuming abnormal operation of the EHB system, the first and second mode switching valves 73 and 74 are kept in an open state for emergency braking, allowing the brake oil of the master cylinder 11 to be directly transmitted to the wheel cylinders 20a, 20b, 20c and 20d through the backup paths 71 and 72. That is, if the driver pushes the brake pedal 10, the hydraulic pressure of the master cylinder 10 may be transmitted to the wheel cylinders 20a, 20b, 20c and 20d through the backup paths 71 and 72.

As is apparent from the above description, in accordance with an embodiment of the present invention, a single circuit is allotted to front wheels and a single circuit is applied to rear wheels. This circuit control may reduce costs.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electro-hydraulic brake system comprising:
    a master cylinder to transmit brake oil;
    a high-pressure accumulator to transmit brake oil independently of the master cylinder;
    a first circuit connected to the master cylinder and the high-pressure accumulator;
    a second circuit connected to the master cylinder and the first circuit;
    a first wheel to be braked by the first circuit; and
    a second wheel to be braked by the second circuit,
    wherein the first circuit includes a first flow-rate control valve to control a flow rate of the brake oil transmitted from the high-pressure accumulator into the first circuit, and the second circuit includes a second flow-rate control valve to control a flow rate of the brake oil introduced into the second circuit,
    wherein the first and second flow-rate control valves are arranged such that a flow path extending from an outlet of the first flow-rate control valve to an inlet of the second flow-rate control valve excludes the high-pressure accumulator.

2. The system according to claim 1, further comprising:
    a first backup path connecting the master cylinder and the first circuit to each other;
    a second backup path connecting the master cylinder and the second circuit to each other;

a first mode switching valve to control connection between the first backup path and the master cylinder; and a second mode switching valve to control connection between the second backup path and the master cylinder.

3. The system according to claim 2, wherein the first mode switching valve, the second mode switching valve, the first flow-rate control valve and the second flow-rate control valve are arranged in a row, to control transmission of the brake oil to the wheels.

4. The system according to claim 3, wherein:

during normal braking, the first mode switching valve and the second mode switching valve are kept in a closed state, and the first flow-rate control valve and the second flow-rate control valve transmit hydraulic pressure generated in the high-pressure accumulator to the first circuit and the second circuit; and during emergency braking, the first mode switching valve and the second mode switching valve are kept in an open state, to transmit hydraulic pressure generated in the master cylinder to the first circuit and the second circuit.

5. The system according to claim 2, further comprising a pressure sensor provided at an entrance side of the first mode switching valve to measure brake pedal pressure.

6. The system according to claim 1, further comprising:

a first inlet path provided with the first flow-rate control valve and connecting the high-pressure accumulator and the first circuit to each other; and a second inlet path provided with the second flow-rate control valve and connecting the first circuit and the second circuit to each other.

7. The system according to claim 6, further comprising:

a first pressure sensor provided at an exit side of the first flow-rate control valve to measure pressure of oil introduced into the first circuit; and a second pressure sensor provided at an exit side of the second flow-rate control valve to measure pressure of oil introduced into the second circuit.

8. The system according to claim 1, wherein each of the first and second flow-rate control valves are two-way valves.

9. The system according to claim 1, wherein the first circuit further includes a first inlet valve fluidly arranged between the first flow-rate control valve and the first wheel, and the second circuit further includes a second inlet valve fluidly arranged between the second flow-rate control valve and the second wheel.

* * * * *